UNITED STATES PATENT OFFICE.

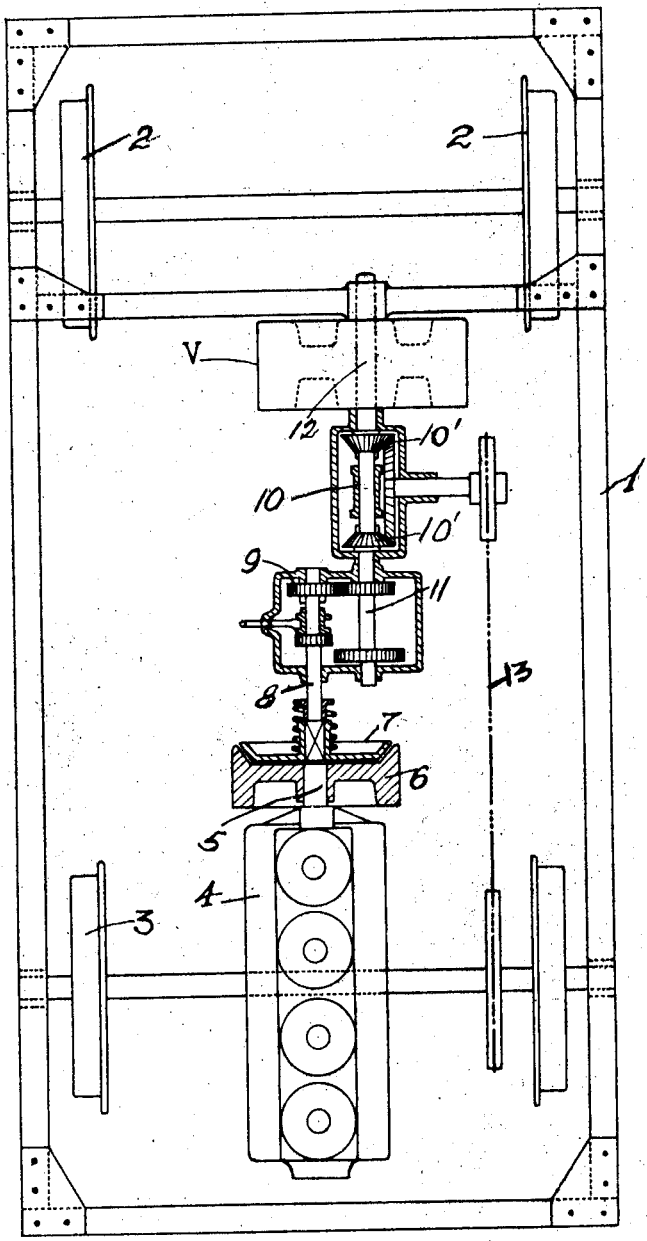

EDMOND ANTOINE LEYMARIE, OF PARIS, FRANCE.

MOTOR-TRACTOR AND THE LIKE.

1,335,249.  Specification of Letters Patent.  Patented Mar. 30, 1920.

Application filed January 31, 1919. Serial No. 274,352.

*To all whom it may concern:*

Be it known that I, EDMOND ANTOINE LEYMARIE, citizen of the French Republic, residing at Paris, Department of the Seine, in France, and whose post-office address is 60 Boulevard de Clichy, in the said city, have invented certain new and useful Improvements in or Relating to Motor-Tractors and the like; and I do hereby declare the following to be a full, clear, and exact description of the invention, such as will enable others skilled in the art to which it appertains to make and use the same.

This invention relates to a motor vehicle, and has for its object the provision of a kinetic energy accumulator for preventing the vehicle from coming to rest immediately after the motor or other source of power is disconnected from the driving wheels, during the changing of the power transmission gears.

In the drawing I have illustrated, diagrammatically, a vehicle constructed in accordance with my invention.

The frame of the vehicle is indicated generally by the reference character 1, which frame is supported by pairs of wheels 2 and 3, the latter being the driving wheels. Suitably supported on the frame is a driving unit 4, which may be any desired form of motor. To the crank shaft 5 of this unit 4 is connected a clutch member 6, which is adapted to coöperate with a complemental clutch member 7, the latter being carried by the main gear shaft 8 and being shifted into and out of coöperative relation with the member 6 in the usual manner. The change speed gearing which is indicated generally by the reference character 9, is located as usual between the clutch and the forward and reversing drive mechanism. The latter mechanism which is arranged on the propeller shaft 11, comprises a slidable sleeve 10, splined on the shaft 11, and adapted to engage clutch faces on the beveled pinions 10' loosely mounted on the shafts 11. This propeller shaft, however, extends rearwardly from the drive mechanism, as at 12 and has secured thereto a fly-wheel V. The motion is transmitted from the drive mechanism to the driving wheel 3 through a suitable connection 13.

The fly-wheel V is so designed as to have a suitable kinetic energy for the ordinary starting speed of the vehicle, for instance, ten kilometers per hour, thus permitting the necessary gear changing operations to be carried out expeditiously. This arrangement enables heavy vehicles to be started at a low gear and changed to a higher gear, although the vehicle has previously only attained a relatively low speed of travel.

I claim:

1. In a tractor the combination with a driving unit of change-speed gearing between the unit and the wheels, a clutch between the change-speed gearing and driving unit and means between the change-speed gearing and wheels for imparting movement to the latter during the shifting of the gears.

2. In a tractor the combination with a driving unit of change-speed gearing between the driving unit and wheels, and a fly-wheel between the gearing and wheels for imparting motion to the latter during the shifting of the gears.

In testimony whereof I affix my signature.

EDMOND ANTOINE LEYMARIE.